United States Patent
Bickel et al.

(10) Patent No.: US 10,001,384 B2
(45) Date of Patent: Jun. 19, 2018

(54) METHOD AND APPARATUS FOR THE RETRIEVAL OF SIMILAR PLACES

(75) Inventors: Steffen Bickel, Nidderau (DE); Hannes Kruppa, Berlin (DE); Peter Siemen, Berlin (DE); Mark Waldaukat, Berlin (DE)

(73) Assignee: HERE Global B.V., Veldhoven (NL)

( * ) Notice: Subject to any disclaimer, the term of this patent is extended or adjusted under 35 U.S.C. 154(b) by 2021 days.

(21) Appl. No.: 12/617,487

(22) Filed: Nov. 12, 2009

(65) Prior Publication Data

US 2011/0109435 A1    May 12, 2011

(51) Int. Cl.
| | |
|---|---|
| G06F 7/00 | (2006.01) |
| G06F 17/30 | (2006.01) |
| G01C 21/36 | (2006.01) |
| H04W 4/02 | (2018.01) |
| H04L 29/08 | (2006.01) |

(52) U.S. Cl.
CPC .......... *G01C 21/3679* (2013.01); *H04L 67/18* (2013.01); *H04W 4/02* (2013.01)

(58) Field of Classification Search
USPC ........................ 707/708, 724, 748, 749, 758, 707/999.001–999.003; 701/409, 532
See application file for complete search history.

(56) References Cited

U.S. PATENT DOCUMENTS

| | | | |
|---|---|---|---|
| 5,893,095 A | 4/1999 | Jain et al. | |
| 6,636,804 B1 | 10/2003 | Joshi | |
| 2006/0069504 A1* | 3/2006 | Bradley et al. | ............... 701/211 |
| 2006/0287810 A1* | 12/2006 | Sadri et al. | .................... 701/200 |
| 2007/0016556 A1* | 1/2007 | Ann | ................... G06F 17/30241 |
| 2007/0219706 A1* | 9/2007 | Sheynblat | ..................... 701/200 |
| 2008/0076451 A1* | 3/2008 | Sheha | ............... G01C 21/3679 455/456.3 |
| 2009/0132513 A1 | 5/2009 | McKee et al. | |
| 2009/0132645 A1* | 5/2009 | Yang | .................. G06F 17/3087 709/203 |

(Continued)

FOREIGN PATENT DOCUMENTS

| | | |
|---|---|---|
| CN | 101206121 A | 3/2009 |
| CN | 101388023 A | 3/2009 |

(Continued)

OTHER PUBLICATIONS

Kang, E. et al., "Personalization Method for Tourist Point of Interest (POI) Recommendation"; On pp. 392-400; Publication date: 2006. Accessed: Apr. 1, 2010, http://books.google.com/books?id=kmKEdpU0pJoC&pg=PA392&lpg=PA392.

*Primary Examiner* — Uyen Le
(74) *Attorney, Agent, or Firm* — Ditthavong & Steiner, P.C.

(57) ABSTRACT

An approach is provided for determining the similarity between a reference point-of-interest and similarity candidate points-of-interest. Data specifying a reference point-of-interest and location data of a search region are received. A reference vector specifying a plurality of features associated with the reference point-of-interest is retrieved. A plurality of candidates for similar points-of-interest are determined based, at least in part, on the search region. A similarity score is determined for each of the candidates. A list of one or more similar points-of-interest is generated based on the similarity scores.

17 Claims, 13 Drawing Sheets

(56) References Cited

U.S. PATENT DOCUMENTS

| | | | |
|---|---|---|---|
| 2009/0143984 A1 | 6/2009 | Baudisch et al. | |
| 2009/0228196 A1* | 9/2009 | Raab ............................. | 701/200 |
| 2009/0265340 A1* | 10/2009 | Barcklay et al. ................ | 707/5 |
| 2010/0030780 A1* | 2/2010 | Eshghi .............. | G06F 17/30271 |
| | | | 707/758 |

FOREIGN PATENT DOCUMENTS

| | | |
|---|---|---|
| JP | 2001324346 A | 11/2001 |
| WO | WO 2008/066242 A1 | 6/2008 |

\* cited by examiner

FIG. 4
MAPPING STRUCTURE
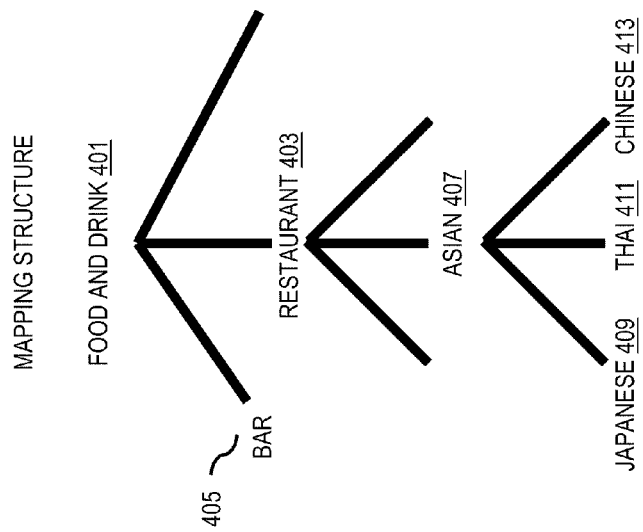
MAPPING CATEGORIES TO FEATURE VECTOR
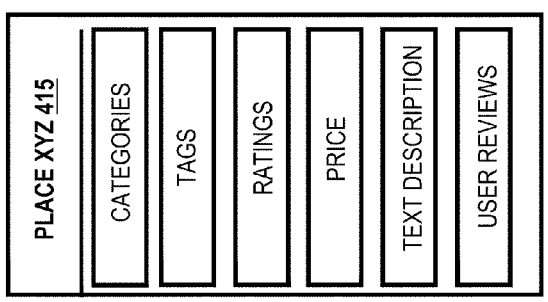

FIG. 7

| WEIGHTING VECTOR 700 | |
|---|---|
| DESCRIPTION | VALUE |
| BAR | .2 |
| RESTAURANT | .2 |
| ASIAN | .3 |
| THAI | .6 |
| CHINESE | .6 |
| ... | ... |
| ATMOSPHERE | .5 |
| FRIENDLY OWNER | .5 |
| LIVE MUSIC | .2 |
| ATM | .5 |
| ... | ... |
| RATING | .2 |
| PRICE 15-25 | 1 |
| PRICE 25-35 | .2 |
| ... | ... |
| ARLINGTON | .2 |
| BEER | .2 |
| FAVORITE | 1 |
| HOME | .3 |
| ... | ... |

701 → BAR...CHINESE
703 → ATMOSPHERE...ATM
707 → RATING
709 → PRICE 15-25, PRICE 25-35
705 → ARLINGTON...HOME

METHOD AND APPARATUS FOR THE RETRIEVAL OF SIMILAR PLACES

BACKGROUND

Service providers (e.g., wireless, cellular, etc.) and device manufacturers are continually challenged to deliver value and convenience to consumers by, for example, providing compelling network services, such as location based services. Many location based services are based upon a variety of information inputted by a user. Such an approach may result in the user not utilizing services provided by the service provider, in large part, because the user is confused by the number of inputs. Thus, user may not utilize available navigation and local searching services because the services are inconvenient or confusing for the user to utilize.

Some Example Embodiments

According to one embodiment, a method comprises receiving data specifying a reference point-of-interest and location data of a search region. The method also comprises retrieving a reference vector specifying a plurality of features associated with the reference point-of-interest. The method further comprises determining a plurality of candidates for similar points-of-interest based, at least in part, on the search region. The method additionally comprises determining a similarity score for each of the candidates and generating a list of one or more similar points-of-interest based on the similarity scores.

According to another embodiment, an apparatus comprising at least one processor, and at least one memory including computer program code, the at least one memory and the computer program code configured to, with the at least one processor, cause, at least in part, the apparatus to receive data specifying a reference point-of-interest and location data of a search region. The apparatus is also caused to retrieve a reference vector specifying a plurality of features associated with the reference point-of-interest. The apparatus is further caused to determine a plurality of candidates for similar points-of-interest based, at least in part, on the search region. The apparatus is additionally caused to determine a similarity score for each of the candidates and generate a list of one or more similar points-of-interest based on the similarity scores.

According to another embodiment, a computer-readable storage medium carrying one or more sequences of one or more instructions which, when executed by one or more processors, cause, at least in part, an apparatus to receive data specifying a reference point-of-interest and location data of a search region. The apparatus is also caused to retrieve a reference vector specifying a plurality of features associated with the reference point-of-interest. The apparatus is further caused to determine a plurality of candidates for similar points-of-interest based, at least in part, on the search region. The apparatus is additionally caused to determine a similarity score for each of the candidates and generate a list of one or more similar points-of-interest based on the similarity scores.

According to another embodiment, an apparatus comprises means for receiving data specifying a reference point-of-interest and location data of a search region. The apparatus also comprises means for retrieving a reference vector specifying a plurality of features associated with the reference point-of-interest. The apparatus further comprises means for determining a plurality of candidates for similar points-of-interest based, at least in part, on the search region. The apparatus additionally comprises means for determining a similarity score for each of the candidates and means for generating a list of one or more similar points-of-interest based on the similarity scores.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4-6 are diagrams used to illustrate the mapping of features to feature vectors, according to various embodiments;

FIG. 7 is a diagram that illustrates segments of a weighting vector, according to one embodiment;

DESCRIPTION OF SOME EMBODIMENTS

Examples of a method, apparatus, and computer program for determining similar points-of-interest to a reference point-of-interest are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Location services such as navigation and local search services are increasingly being offered to users that may utilize these services using their user equipment (UE) 101. As mentioned, many location services require the user to input a variety of information to determine a local area search result. To bring these location services to the user the service provider can receive the user input, perform the search, and output results to the user. Users frequently select to use local search applications and services that retrieve correct search results in an efficient and convenient manner. However, it may be burdensome for a service provider of the local search services to provide these services in an efficient and convenient manner because data about POIs may be structured in a manner that is designed to store the information and not create quick and efficient searches. As such, there is a need for service providers to provide quick and efficient searches for location services that are convenient for a user to utilize.

Figure 1:
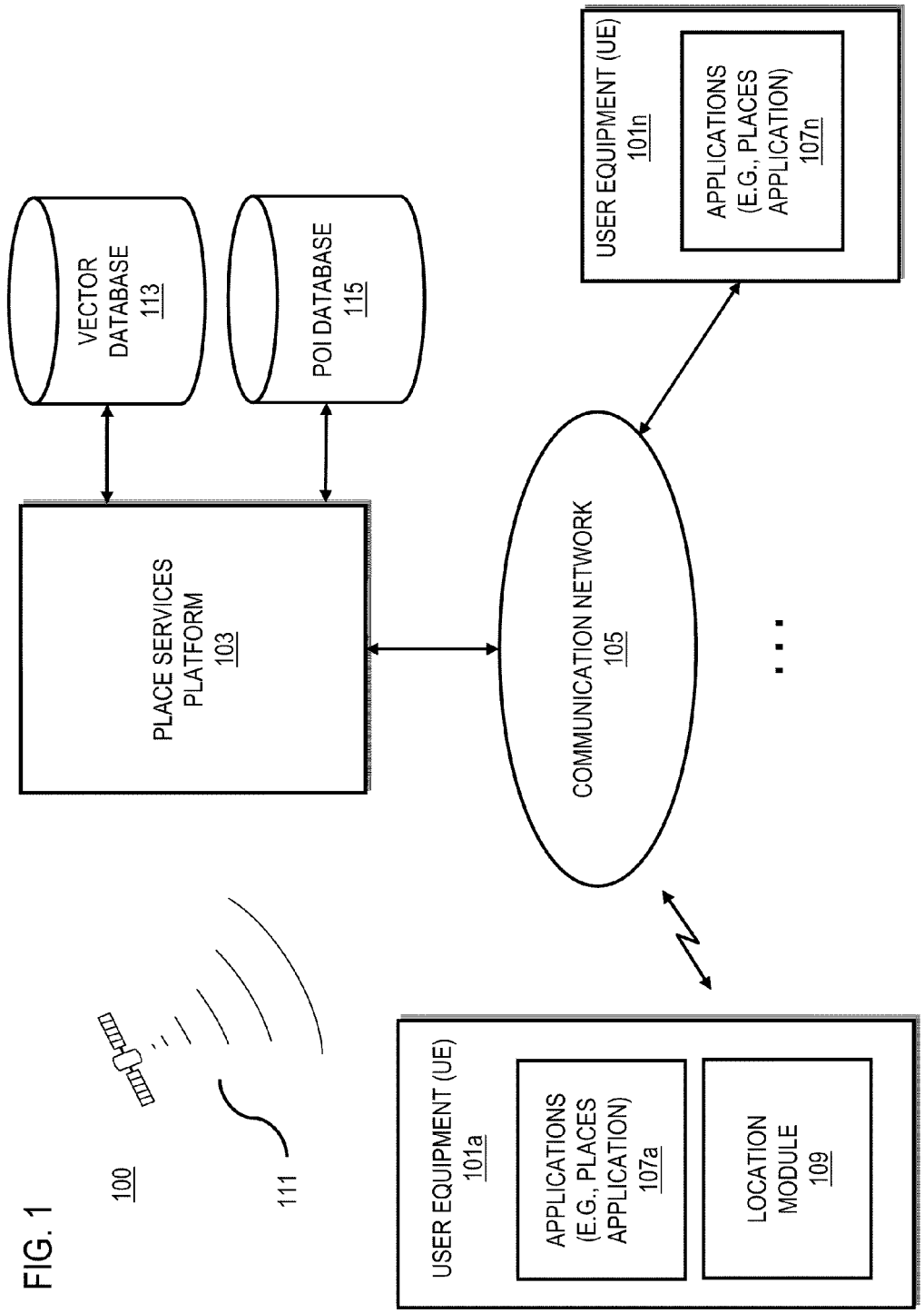
FIG. 1 is a diagram of a system capable of providing similar points-of-interest to a user based on a reference point-of-interest, according to one embodiment.

In recognition of these needs, the system 100 of FIG. 1 introduces the capability to determine similar POIs based on a reference POI, according to one embodiment. In this manner, the user may conveniently choose a reference POI to view similar POIs nearby the user in a region selected by the user on the user's UE 101. The UE 101 may generate a query including the reference POI and location information. Next, the UE 101 may transmit the query to a place services platform 103 via a communication network 105 relaying a request for POIs similar to the reference POI in a particular region. The user can specify the parameters of the query using a places application 107a-107n on a UE 101a-101n (for example, UE 101a). A places application 107a of the UE 101a can retrieve the location of the user via a location module 109 of the UE 101a. The location module 109 can determine a position of the UE 101a using global positioning system (GPS) satellites 111, other triangulation systems, or other location determination technologies. Thus, in some scenarios, the user need only specify a reference POI to receive similar POIs to the reference POI in a certain region or nearby a certain location. Additionally or alternatively, the search location may be specified by the user. The place services platform 103 may receive the information in the query from the UE 101 and prepare a response using a vector database 113 and a POI database 115.

The vector database 113 can store information about POIs using feature vectors and weighting vectors. In certain embodiments, a feature vector includes information about properties of a POI that may be used to determine similarity measures (e.g., a similarity score) of the POI and another POI. Feature vectors can be created by mapping information associated with POIs to feature vector models as described in FIGS. 4-6. Feature vector models are data structures that allow for vector values to be mapped to certain feature descriptions. Various methods can be utilized to determine the similarity between feature vectors. In one embodiment, as further detailed in the description of FIGS. 2 and 8, weighting vectors can be used to determine the similarity between two feature vectors. Weighting vectors can be determined by using training sets of similar feature vectors associated with POIs. Training sets of similar feature vectors are feature vectors that are associated with POIs that are predetermined to be similar. These training sets can be used as a basis in determining which features are more important and thus deserve more weight in determining similar POIs. A more detailed description of weighting vectors is provided in the description of FIG. 7.

Moreover, the POI database 115 can include additional information about POIs. The information may include information that would be displayed to a user as a result of a local search, information that the user may find interesting, or other information that describes the POI. Examples of information that a user may find interesting or may be displayed to the user include information about categories describing the POI, ratings for the POI, a price associated with the POI, textual description of the POI, user reviews of the POI, appropriate dress code, contact information, and location information of the POI (e.g., address). Examples of other information that describes the POI can include GPS coordinates, mapping information, and information that could be useful in processing information about the POI.

In response to the query, the place services platform 103 can retrieve a feature vector associated with the reference POI from the vector database 113. The place services platform 103 may further retrieve data about other POIs (e.g., candidate POIs), in the specified search region from the POI database 115 and feature vectors of the other POIs from the vector database 113. Next, a comparison is made for each of the feature vectors of the other POIs to the feature vector of the reference POI. From the comparison, the place services platform 103 is able to determine a similarity measure (e.g., a similarity score) of the similarity of each POI to the reference POI. Once similar POIs are found, the results can be transmitted to the user on the user's UE 101. The UE 101 may then be caused to present the results to the user.

The UE 101 is any type of mobile terminal, fixed terminal, or portable terminal including a mobile handset, station, unit, device, multimedia computer, multimedia tablet, Internet node, communicator, navigation device, desktop computer, laptop computer, Personal Digital Assistants (PDAs), or any combination thereof. It is also contemplated that the UE 101 can support any type of interface to the user (such as "wearable" circuitry, etc.). In one example, the location module 109 of a UE 101 (e.g., UE 101a) can utilize one or more technologies for determining the UE's location. For instance, the location can be determined by a triangulation system such as a global positioning system (GPS), Assisted-GPS (A-GPS), Cell of Origin, WLAN triangulation, or other location extrapolation technologies. Standard GPS and A-GPS systems can use satellites 111 to pinpoint the location of a UE 101. A Cell of Origin system can be used to determine the cellular tower that a cellular UE 101 is synchronized with. This information provides a coarse location of the UE 101 because the cellular tower can have a unique cellular identifier (CellID) that can be geographically mapped. The location module 109 may also utilize multiple technologies to detect the location of the UE 101. Moreover, the UE 101 may include a communication device that allows the UE 101 to interact with the place services platform 103, the vector database 113, and/or the POI database 115.

As shown in FIG. 1, the system 100 comprises the UE 101 having connectivity to the place services platform 103 via the communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

By way of example, the UE 101 and the place services platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
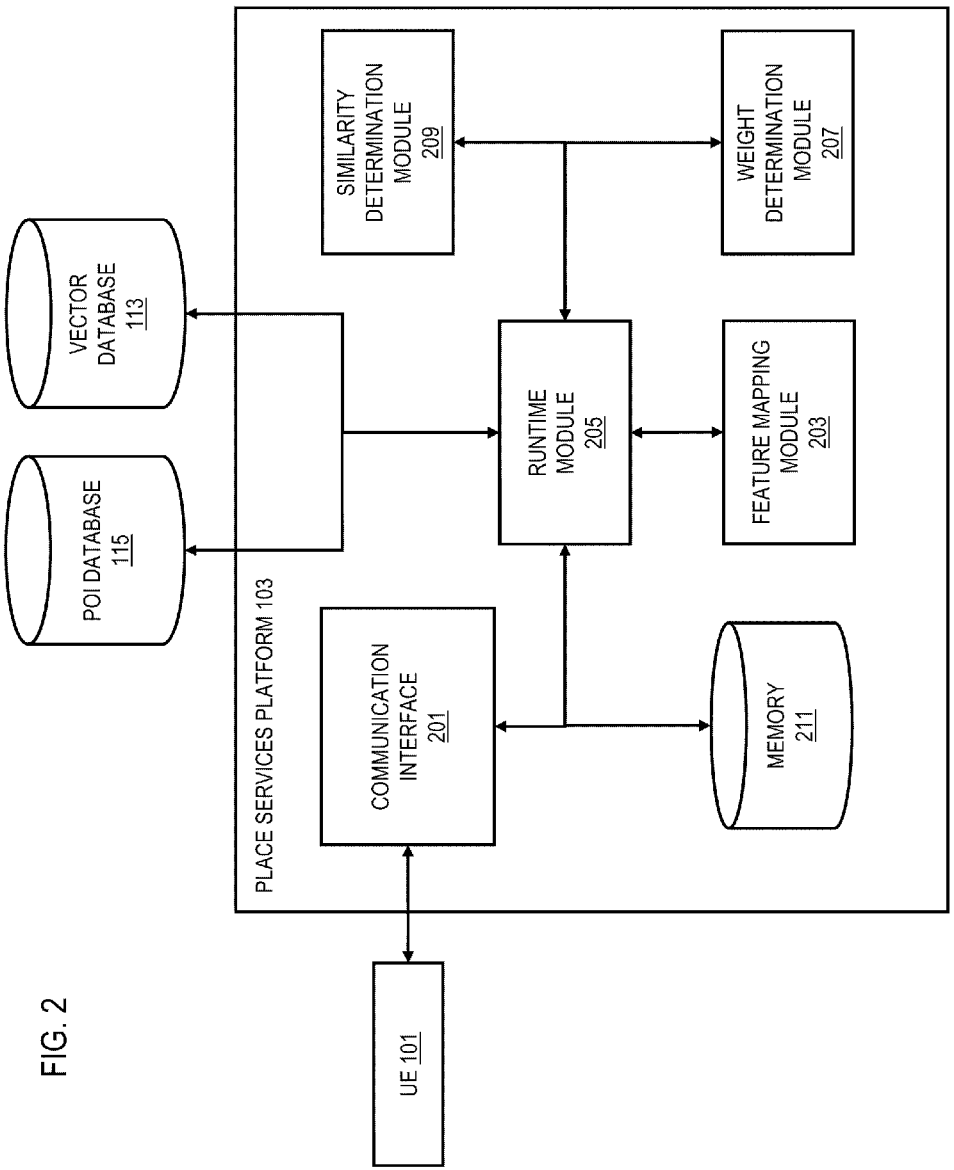
FIG. 2 is a diagram of the components of place services platform, according to one embodiment.

FIG. 2 is a diagram of the components of the place services platform 103, according to one embodiment. By way of example, the place services platform 103 includes one or more components for determining similar POIs based on a reference POI. It is contemplated that the functions of these components may be combined in one or more components or performed by other components of equivalent functionality. In this embodiment, the place services platform 103 includes a communication interface 201 to communicate with UEs 101, a feature mapping module 203 to create and map features to feature vectors, a runtime module 205 to coordinate activities between other modules, a weight determination module 207 to determine weighting vectors, a similarity determination module 209 to determine a similarity measure between two feature vectors, and a memory 211.

As shown in FIG. 2, the place services platform 103 can include a communication interface 201. The communication interface 201 can be used to communicate with a UE 101. Certain communications can be via methods such as an internet protocol, messaging, or any other communication method (e.g., via the communication network 105). Other communications may be via other data interfaces, such as a bus for fiber channel connections to a database. In some examples, the place services platform 103 can receive a query from a UE 101 via the communication interface 201. The place services platform 103 may then determine a response via the runtime module 205, store the response in the memory 211, and transmit a response to the UE 101 via the communication interface 201. Moreover, the communication interface 201 may be used to communicate with other service platforms that may contain information useful to the place services platform 103 and communication terminals that may be used to enter and update data.

As noted above, the feature mapping module 203 may be used to create and/or map features onto a feature vector model for a new or updated POI associated with the place services platform 103. The feature mapping module 203 can map features such as categories, tags, ratings, price information, text description information, user review information, etc. to a feature vector associated with a POI. Under certain scenarios, the text description information may be word occurrences or phrases associated with a textual description. The feature mapping module 203 may be used by the runtime module 205 to control the mapping of the features of the POI to the feature vector of the POI. Under one scenario, the POI is new to the vector database 113. Under this scenario, POI information is retrieved from the POI database 115 and then features of the POI are mapped onto the feature vector for the POI. The feature vectors may be stored in the vector database 113. Further, the mapping may be in response to an update by users utilizing a UE 101 and/or an administrator using a communication terminal. For example, ratings information or other information about a POI may be modified by an authorized entity. The vector database 113 may be updated with the modified information.

Moreover, the runtime module 205 may utilize a weight determination module 207 to determine weights used to determine similarities between two feature vectors. The weight determination module 207 may be used to create weighting vectors and determine values for weighting vectors stored in the vector database 113. Under some scenarios, the weighting vectors are created and associated with POIs based on training sets of feature vectors. A training set can be a set of feature vectors that are considered to be similar. For example, a training set may include a Sushi Tuna POI in New York and a similar Sushi Fatty Tuna POI in Los Angeles. The weighting vector can be determined by increasing (reflecting that the similarity for the feature is important) the weighting for features that are common among the training set and decreasing the weighting for features that are uncommon among the training set. In certain embodiments, certain weighting vectors may be associated with feature vectors based on a context of the POI. For example, certain categories of POIs may have different weightings than other categories of POIs. A weight in each associated weighting vector can be determined for each entry of the feature vectors. Additionally, certain features, such as classification features, may have a greater weighting than other features (e.g., a certain tag features). Further, the weighting vectors may be adjusted or created manually based on similarities between POIs.

In some embodiments, the similarity determination module 209 is used by the runtime module 205 to determine the similarity between two POIs based on their respective feature vectors. The similarity determination module 209 can receive a reference feature vector of a reference POI and another feature vector of another POI and determine a similarity score between the two feature vectors. In some embodiments, the similarity determination module 209 may additionally use a weighting vector associated with either the reference POI or the other POI to determine the similarity score. The similarity score under those embodiments may be determined by computing an inner vector product of the weighting vector (w), the reference feature vector (r), and the other feature vector (p). The similarity score (e.g., the weighted inner vector product) may be computed a by the following equation, where i=1 to the number of features associated with the vectors:

$$\text{similarity}(r, p) = \sum_{i=1 \to n} w_i r_i p_i$$

In this equation, the weighting vector, reference feature vector, and other feature vector have the same number of dimensions. As shown in the equation, the weighted inner product is the sum of all products of each single w, r, and p value. The inner vector product reflects that the greater similarities between two POIs, the greater the score. In the case of categories, a POI may receive a greater score in relation to the reference POI based on the number of common categories the two POIs share.

Moreover, the similarity determination module 209 may be used to determine similarities between a reference POI and the other POI based on user data. User data of favorite places (e.g., POI) list of a particular user or user ratings of various POIs by the particular user may be used to determine similarity measures (e.g., a score). For example, additional points may be added to a determined weighted inner vector product score if the other POI is highly rated by the particular user or is in the particular user's favorite places list.

Figure 3:
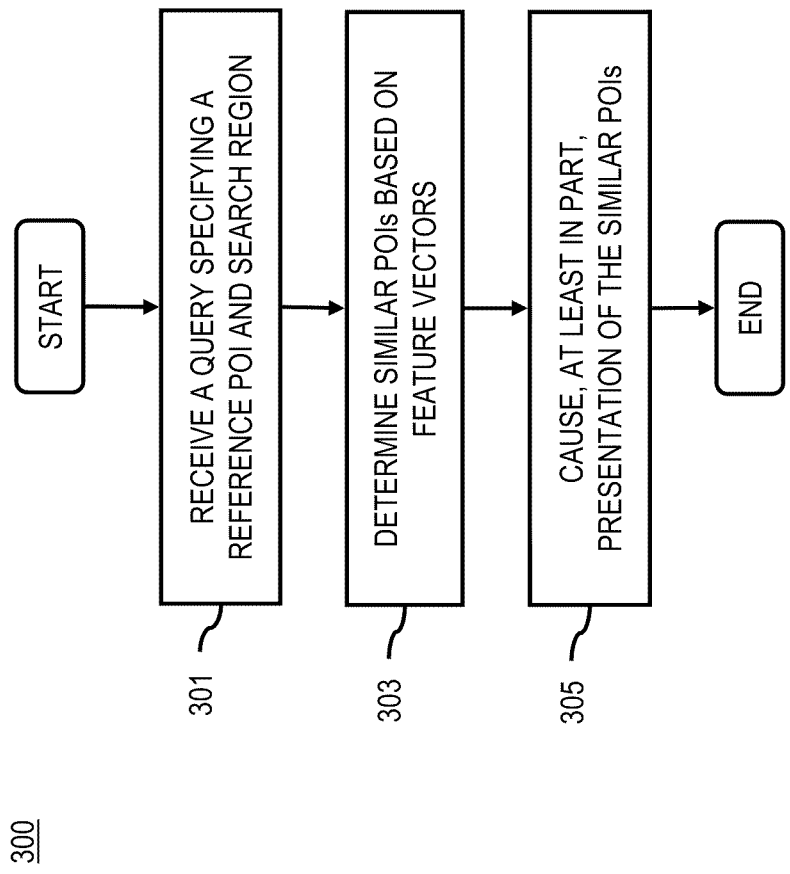
FIG. 3 is a flowchart of a process for determining similar points-of-interest using feature vectors, according to one embodiment.

FIG. 3 is a flowchart of a process for determining similar points-of-interest using feature vectors, according to one embodiment. In one embodiment, the runtime module 205 performs the process 300 and is implemented in, for instance, a chip set including a processor and a memory as shown FIG. 12. The runtime module 205 of the place services platform 103 can provide location services to a user using a UE 101. The UE 101 may request these services by generating and transmitting a query to the place services platform 103.

In step 301, the runtime module 205 receives the query from the UE 101 specifying a reference POI and a search region. The reference POI may be selected by the user via a user interface (e.g., the user interface of FIG. 9). The reference POI may be identified using an identifier (e.g., a name, location coordinates, etc.) that corresponds to a POI database 115 and/or a vector database 113. Moreover, the search region can be specified using location data. Location data may include a starting point and a radius indicating the region, a bounded region based on location coordinates, identifiers that can be mapped to regions, a city, a neighborhood, a zip code, or the like. In certain embodiments, the location data may include the actual location of the UE 101 (e.g., via GPS coordinates) derived from the location module 109.

Once the query is received, the runtime module 205 determines similar POIs to the reference POI based on feature vectors (step 303). The runtime module 205 can determine a set of candidates for similar POIs to the reference POI based on the search region. The candidates may be retrieved from the POI database 115 or the vector database 113 based on the search region. For example, a POI can be a candidate if the POI is within the search region. The POI database 115 and/or the vector database 113 may include location data of the POIs. In one example, a structure containing information about a POI in the vector database 113 may include an identifier identifying the POI, location data of the POI (e.g., GPS coordinates), a weighting vector, and a feature vector. In another example, a structure containing information about a POI in the POI database 115 may include an identifier identifying the POI, location data of the POI, and POI information content. In certain embodiments, the vector database 113 and the POI database 115 may be combined into a single database. Once the set of candidates are determined, the runtime module 205 retrieves a feature vector associated with each of the candidates and a reference feature vector associated with the reference POI from the vector database 113. In some embodiments, the runtime module 205 also retrieves a weighting vector associated with the reference POI. The weighting vector may be indicated by a pointer associated with the reference feature vector. The runtime module 205 can then cause the similarity determination module 209 to determine a similarity score for each of the candidates. A set of the candidates can be selected as part of a list with a certain amount of similarity (e.g., based on the similarity scores) to the reference POI.

In certain embodiments, the list is transmitted to the UE 101 for display. Thus, the runtime module 205 can cause, at least in part, actions leading to the presentation of the similar POIs to the user via the UE 101 (step 305). The presentation can occur on a user interface of the UE 101 (e.g., the user interfaces displayed in FIGS. 9 and 10). The display can include the similar POIs, the similarity scores associated with each of the similar POIs, and other data pertaining to the POIs.

With the above approach, the user is able to quickly and efficiently receive a presentation of similar POIs to a reference POI. The similar POIs can be quickly and efficiently determined based on the feature vectors associated with the reference POI and the candidate POIs. This is because the feature vectors can be used to quickly score the candidate POIs. Moreover, because the similarity score can be ascertained from feature vectors, a similarity score for each POI available need not be ascertained and/or stored, saving memory space.

Figure 5:
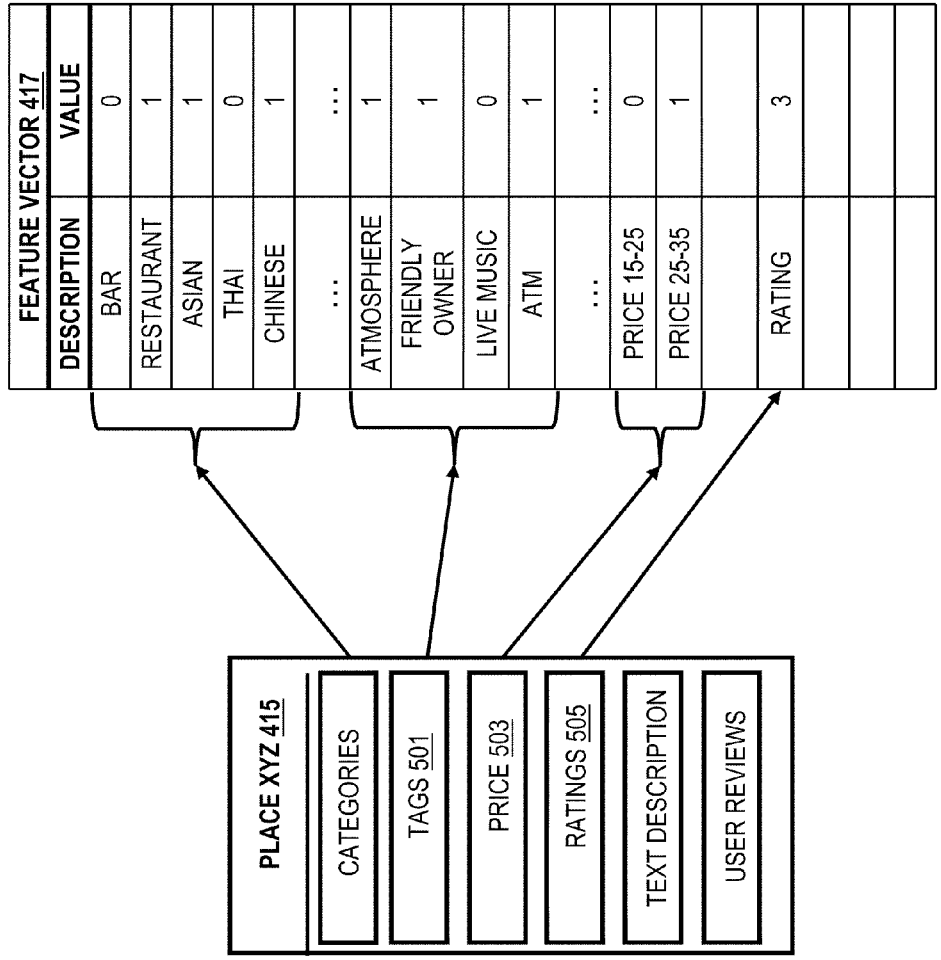
Figure 6:
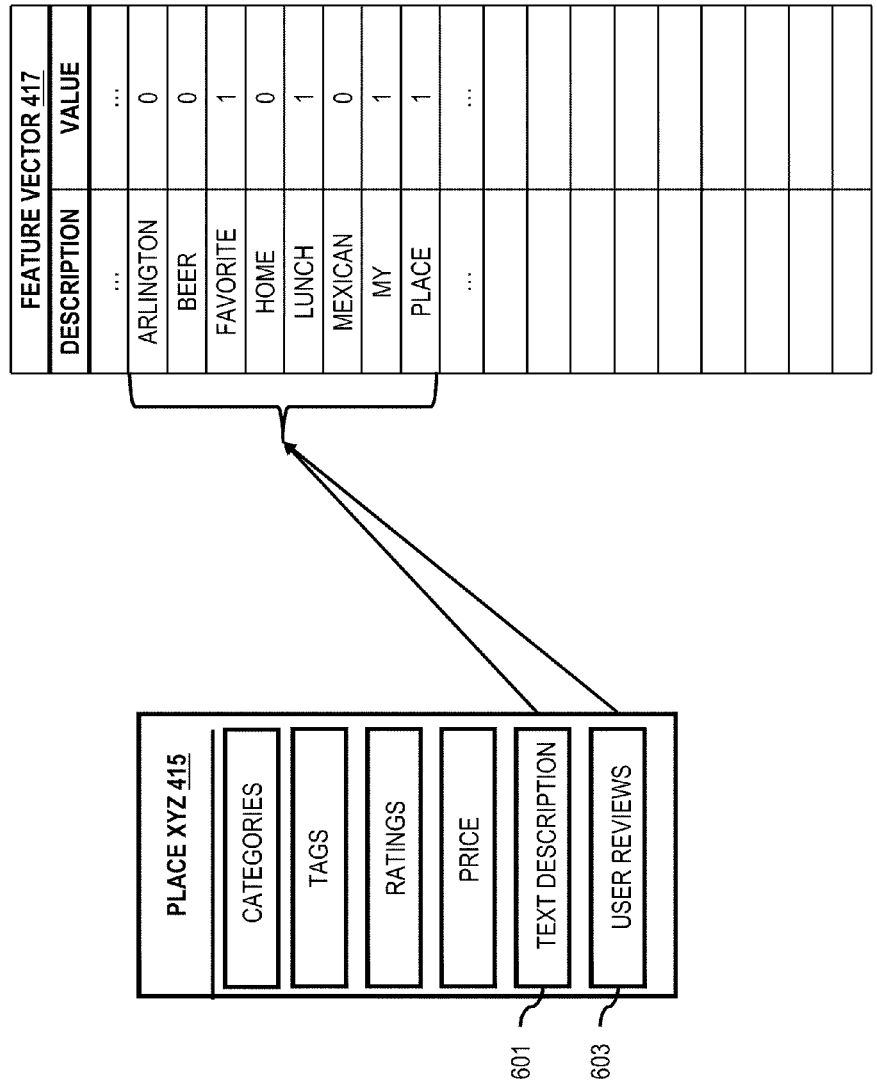

FIGS. 4-6 are diagrams used to illustrate the mapping of features to feature vectors, according to various embodiments. Mappings of various features may be mapped onto different POI types. The same feature vector model may be used for each POI type or different feature vector models may be used for each POI type. A POI type may be the highest level of classification of a POI. As previously noted, in certain embodiments, a feature vector model is a data structure outlining features without values entered for individual POI mappings. The features may include information about a POI that may indicate similarities between two or more POIs. Exemplary features may include the mapping of classifications (e.g., categories) of the POIs, tagged associations with the POIs, a cost to go to the POI, ratings of the POI, and text-based descriptions. Features of individual POIs may be mapped onto feature vector models.

The POI classifications can be based on a taxonomy associated with the POI. An exemplary taxonomy mapping structure is displayed in FIG. 4. The exemplary taxonomy mapping of FIG. 4 displays a component of the taxonomy specific to a Food and Drink 401 tree, however, other taxonomies and classifications for other POIs and POI types (e.g., landmarks, museums, office buildings, professional service providers, hospitals, etc.) may be used. The classifications can be used to generate a classification segment of a feature vector model. The classifications may begin with more general POI information such as a type of POI (e.g., Food and Drink 401) and narrow to more specific classifications such as Restaurant 403 and Bar 405. Each classification node can include subcategories that have more and more specific classifications. For example, the Restaurant 403 category can include an Asian category 407, an Italian category (not shown), or categories for different types of food. Moreover, the Asian category 407 may have additional subcategories such as Japanese 409, Thai 411, and Chinese 413. FIG. 4 also displays Place XYZ 415, a POI that can be mapped onto a feature vector 417. The feature vector 417 shows a description section which represents the feature vector model and a value that is mapped for each POI. A value may be set to 0 if the feature is not associated in Place XYZ 415 and 1 if the feature is associated with the POI. In certain embodiments, if a leaf node (e.g., Chinese 413) in the taxonomy is set to a value of 1, each node from the root (e.g., Asian 407, Restaurant 403, and Food and Drink 401) are also set to 1 because the available feature of the leaf node may inherently indicate that the nodes in the taxonomy are available features. The features may be mapped using conventional data entry techniques as well as by parsing information from a POI database 115. Additionally, these values may be updated by a user via a UE 101.

FIG. 5 displays an exemplary mapping of features of Place XYZ 415 to feature vector 417. As described above, the feature vector model for the tags and price features may include feature variables for various tags 501 and price ranges 503. For example, tags may indicate whether the POI has certain features, such as whether there is a nice atmosphere, a friendly owner, live music, an automated teller machine (ATM), restrooms, etc. As with the categorical mappings, the value for the individual tags 501 or price ranges 503 can be indicated by whether the POI is associated with the feature or not associated with the feature. Under one scenario, the price ranges 503 may be overlapping (e.g., the price ranges may include $15-$25, $20-$30, and $25-$35). In this scenario, POIs may be associated with more than one price range (e.g., two price range vectors are set to 1). Moreover, in other scenarios, the price ranges may be configured so that one of the price ranges is inclusive of a price and another is not (e.g., the price ranges may be $15.01-$25.00 and $25.01-$35.00). Additionally, a mapping of a rating of Place XYZ to the feature vector 417 is displayed. The rating feature value can be based on ratings provided by users, by processing a POI database 115, or by data entry. The rating 505 can be a value such as an integer or floating point number or be based on categories associated with binary numbers like the pricing vector values.

FIG. 6 displays the mapping of text based descriptions to the feature vector 417. A mapping of text to a feature vector may be considered a vector space representation. A simple text mapping may set a text feature value to 1 if the text description 601 or user reviews 603 are determined to include the description string. For example, a string in a user review including "My favorite lunch place" associated with Place XYZ 415 may set the feature vector values of "favorite," "lunch," "my," and "place" to 1. Further, a language model (e.g., a model to associate different words based on word meaning, context, correlation, and the like) can be used to extract topics that may be useful in determining similarities between two POIs and generating entries in the feature vector for such topics. A language model assigns a probability to a given sequence of words and may be used to map a description into one or more semantic topics. Language models may be executed upon text descriptions 601 and user reviews 603 that are stored with the Place XYZ 415 to determine the associated feature vector 417. A topic model may set the value of a corresponding description (e.g., Arlington, beer, favorite, etc.) based on an abstraction of words. The abstraction of words is considered a topic. For example, a beer topic may be extracted from a grouping of various types of beers present in the textual description. Thus, a topic may be one or more terms that can be described using different words. Moreover, these vector space representations may be appended to the feature vector 417. In certain embodiments, these feature vector 417 variables may be included in each POI and values set to zero if the particular POI is not associated with those descriptions. In another embodiment, different types of POIs (e.g., a food and drink POI, landmark POI, etc.) may utilize different sets of text description and user review description variables.

FIG. 7 is a diagram that illustrates segments of a weighting vector 700, according to one embodiment. The first segment 701 can include weights for classifications of POIs. These features may be considered more important and attain greater weighting values because similar POIs generally have similar categorical features. Moreover, the tag segment 703 and text description segment 705 may indicate weights for tags or strings associated with POIs. These features may be weighted based on how adequate the features are to distinguish between POIs based on the training sets. For example, for certain POIs, live music may be granted greater import than having an ATM. Moreover, a rating 707 may have a lesser weighting if actual values of ratings are used in the feature vectors. Further, certain price ranges 709 (e.g., more expensive price ranges) may be better suited for determining similarities than more common price ranges. Weightings may be based on a favorites list of the user or based on user ratings of a particular user. For example, weightings can be adjusted based on what a particular user considers to be good (e.g., is on the user's favorites list). Additionally, user rankings completed by a single user can be used to determine tastes of that particular user and may be used for adjusting weightings. As described above, a machine learning algorithm can receive this information as input and adjust the weightings of certain features that are associated with the POIs on the favorites list to have a greater degree of influence on the scores.

Figure 8:
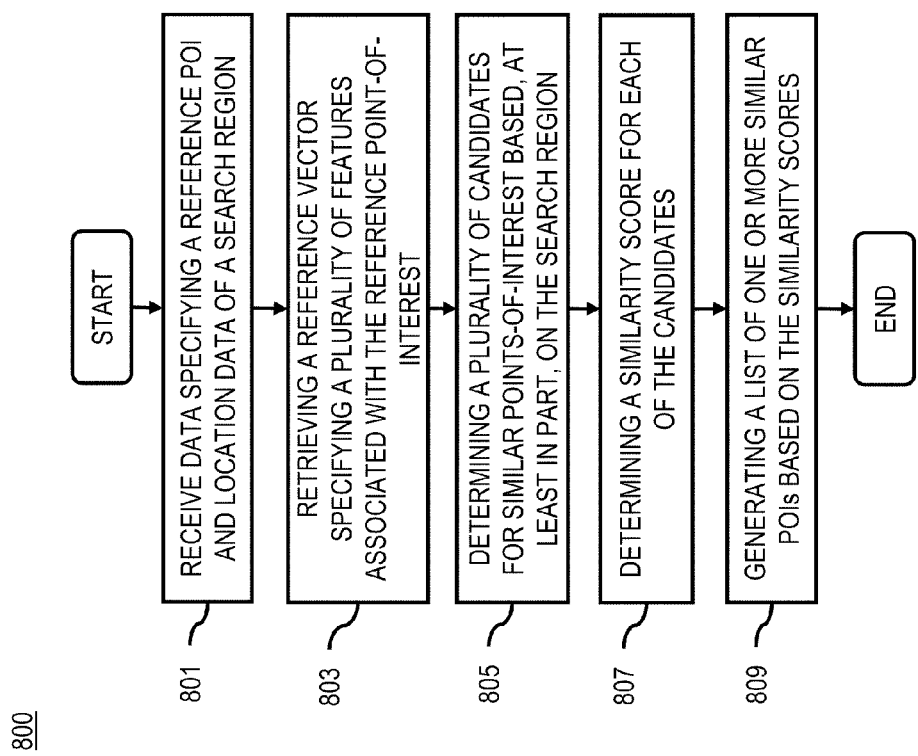
FIG. 8 is a flowchart of a process for retrieving similar points-of-interest using feature vectors, according to one embodiment.
Figure 12:
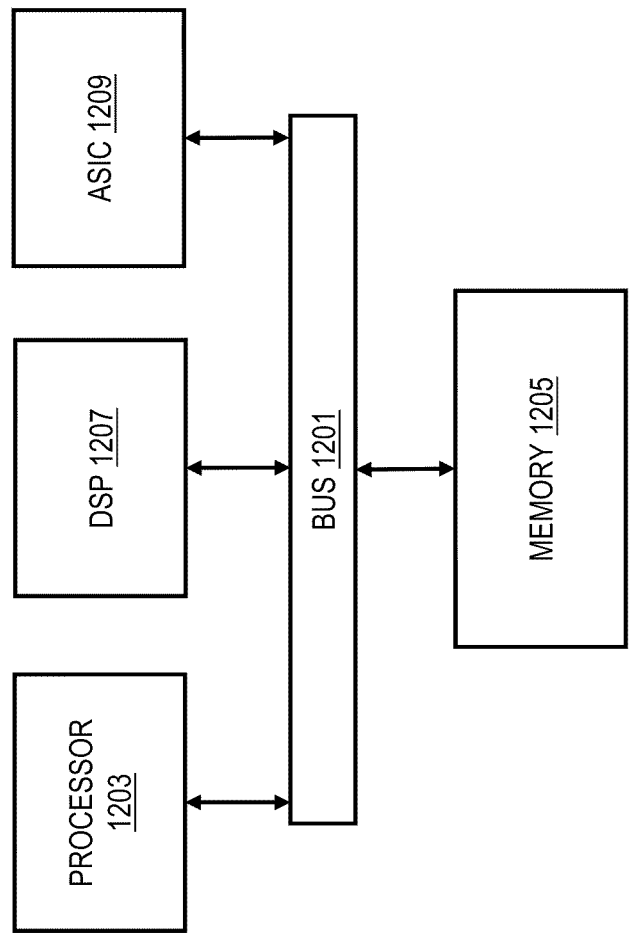
FIG. 12 is a diagram of a chip set that can be used to implement an embodiment of the invention.

FIG. 8 is a flowchart of a process for retrieving similar points-of-interest using feature vectors, according to one embodiment. In one embodiment, the runtime module 205 of a place services platform 103 or a module of the UE 101 performs the process 800 and is implemented in, for instance, a chip set including a processor and a memory as shown in FIG. 12. The following processes are described in relation to the runtime module 205; however it is contemplated that the processes may be executed, partially or in full, on a UE 101.

In step 801, the runtime module 205 receives data specifying a reference POI and location data of a search region. This data may be used to determine similar POIs to the reference POI for presentation to a user. The reference POI may be specified using a user interface (e.g., the user interfaces of FIGS. 9 and 10) of the UE 101. For example, the user may select a reference place from a favorites list or via a local web search. Additionally, the search region may be specified using the user interface or via a location module 109 that determines the current location (e.g., via GPS coordinates, longitude, latitude, etc.) of the UE 101. The reference POI need not have any relation to the search region or the current location of the UE 101. Thus, the reference POI can be far away from the similar POIs.

Then, the runtime module 205 retrieves a reference vector specifying a plurality of features associated with the reference POI (step 803). The reference vector can be a feature vector stored and retrieved from a vector database 113. Moreover, the runtime module 205 may determine a plurality of candidates for similar POIs based, at least in part, on the search region (step 805). The candidates can be determined based on the relationship of the location of the candidate and the search region. For example, if a POI is within the search region, the POI may be considered a POI candidate. Then, feature vectors associated with each of the candidates specifying features respectively associated with the candidates are retrieved from the vector database 113. In certain embodiments, feature vectors for POIs are stored in the vector database 113 in a data structure including an identifier for the POI, location data of the POI, and the feature vector associated with the POI. Instances of these data structures may be indexed in an organized geospatial index. The geospatial index can organize the POIs based on groupings of locations (e.g., buckets containing all POIs for a given bounded region in a bucket organization data structure) so that the search based on a search region can quickly retrieve feature vectors for the candidates. For example, the nearest POIs associated with the location data may be retrieved by examining the grouping associated with the location data and then looking at neighboring groupings. As such, the geospatial index may be optimized for geospatial and similarity lookups so that similarity candidates in a search region may be quickly and efficiently determined.

Once the candidates are selected, the runtime module 205 determines a similarity measure such as a similarity score for each of the candidates (step 807). The similarity scores may be based on a comparison of the feature vector of the individual candidates and the reference vector. In certain embodiments, the similarity score is additionally based on a weighting vector associated with the reference POI. The weighting vector need not be pre-associated with the reference POI. The weighting vector may also be retrieved from the vector database 113. In one embodiment, the similarity score for each candidate can be a computed weighted inner vector product (as previously described) of the weighting vector, the reference feature vector, and the candidate feature vector.

In certain embodiments, the weighting vectors may be modified based on user data received from user equipment. The user data can be a favorites list of the user or a user rating of specified POIs. These inputs can help define what the user considers important for POIs the user likes or thinks are similar. This optional information may be used as partial or complete training sets to define similarity weighting vectors for the user. As such, the feature vectors of the specified POIs can be retrieved and used to modify the weighting vector using the weight determination module 207. In certain embodiments, only certain segments of the weighting vector are modified (e.g., if the user seems to like places with high user ratings, the user ratings weights may be provided a greater influence). Moreover, this information may be used by a machine learning algorithm associated with the weight determination module 207 to provide the modified weighing vectors. In other embodiments, a separate similarity measure (e.g., a partial score) is determined for the candidates based on the user data. This similarity measure may be added or subtracted from the similarity score as detailed in the description of the similarity determination module 209.

Figure 9:
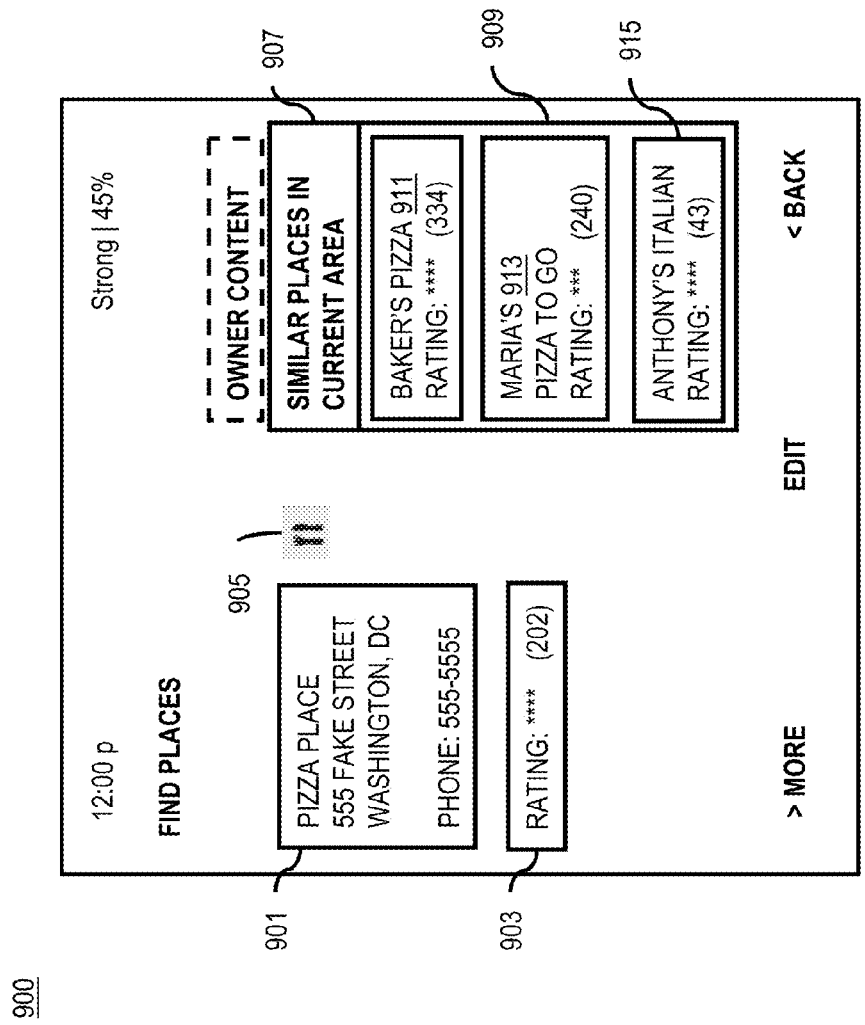
FIGS. 9 and 10 are diagrams of user interfaces utilized in the processes of FIG. 3 and FIG. 8, according to various embodiments.
Figure 10:
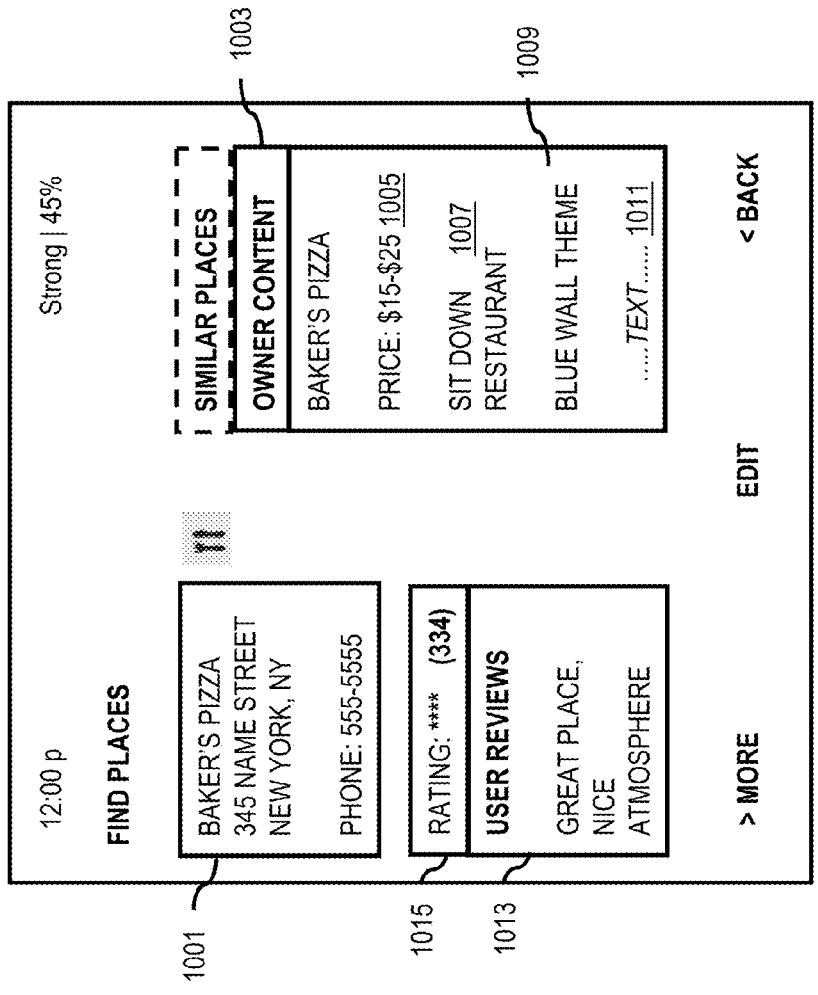

Then, at step 809, the runtime module 205 generates a list of one or more similar POIs based on the similarity scores of the candidates. In certain embodiments, the candidates with the greatest scores are considered to be most similar and are therefore included in the list. In other embodiments, the list can be based on determined criteria (e.g., a certain range of scores are included in the list, etc.). Then, the runtime module 205 can select one of the candidates or the list of candidates to be presented based on the similarity scores (e.g., by presenting the POI associated with the greatest score). The one candidate can be associated with candidate POI data in the POI database 115. This data may be retrieved from the POI database 115. Then, actions leading to the presentation of the candidate data can be caused by the runtime module 205. The presentation may be via a user interface of the UE 101. In certain embodiments, the presentation includes display areas of similar places as shown in FIGS. 9 and 10. Moreover, the presentation may include a map of the search region. The POIs and/or the user location may be displayed on the map. Under one scenario, the list of selected candidates (e.g., the candidates with the greatest scores) are presented on the map. In this scenario, the candidate with the greatest score may be highlighted during the presentation.

The above approach allows for a UE 101 or a place services platform 103 to quickly and efficiently determine similar POIs for a user. The use of feature vectors allows for simple calculations to be made to determine similarity scores between a reference POI and candidate POIs in a short time period. Because simple calculations are made, the energy consumption of the UE 101 may be reduced, increasing battery life for a UE 101 using this service. Moreover, the use of feature vectors may save space on the UE 101 or the place services platform 103 because only a fixed amount of information about the feature vectors of the reference POI and the candidate POIs is needed.

FIG. 9 is a diagram of a user interface 900 utilized in the processes of FIGS. 3 and 8, according to one embodiment. The user interface 900 can include various methods of communication. For example, the user interface 900 can have outputs including a visual component (e.g., a screen), an audio component, a physical component (e.g., vibrations), and other methods of communication. User inputs can include a touch-screen interface, a scroll-and-click interface, a button interface, a microphone, etc. The user interface 900 can be selected to view a selected place (e.g., Pizza Place 901). The user interface 900 may display features associated with the place, such as ratings 903, a type of establishment 905, etc. The user may additionally select to view similar places in an area 907 by making a selection. The selected place may be a reference POI in determining characteristics of the similar places. Further, the similar places can be associated with a location of the user and the user's UE 101. A similar places display 909 can display similar places to the selected place. In this example, the displayed similar places (e.g., POIs) include Baker's Pizza 911, Maria's Pizza to Go 913, and Anthony's Italian 915. These POIs can be selected for display based on feature vectors associated with each of the POIs. For example, the feature vectors associated with Baker's Pizza 911, Maria's Pizza to Go 913, and Anthony's Italian 915 may have features similar to Pizza Place 901, such as all may serve Pizza, all may have delivery service, etc. Additionally, Baker's Pizza 911 and Maria's Pizza to Go 913 may be more similar to Pizza Place 911 than Anthony's Italian 915 because Anthony's Italian's feature vector indicates that it serves a greater variety of food than Pizza Place 901, Baker's Pizza 911, and Maria's Pizza to go 913. Of this similar places display 909, the user may select one of the similar places.

FIG. 10 diagrams the user interface 1000 after the user selects Baker's Pizza 1001. Content about the Baker's Pizza 1001 POI can be displayed in the Owner Content display 1003. This content can be retrieved from the POI database 115 when Baker's Pizza 1001 is selected. The content can include a price range 1005 of an average customer using the services of Baker's Pizza 1001. Additionally, other features, such as tagged features (e.g., sit down restaurant 1007, blue wall theme 1009, etc.) and/or a textual description 1011 may be displayed in the Owner Content display 1003. Further, user reviews 1013 and ratings 1015 of the POI can be displayed to the user.

The processes described herein for determining similar points-of-interest based on retrieved feature vectors may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
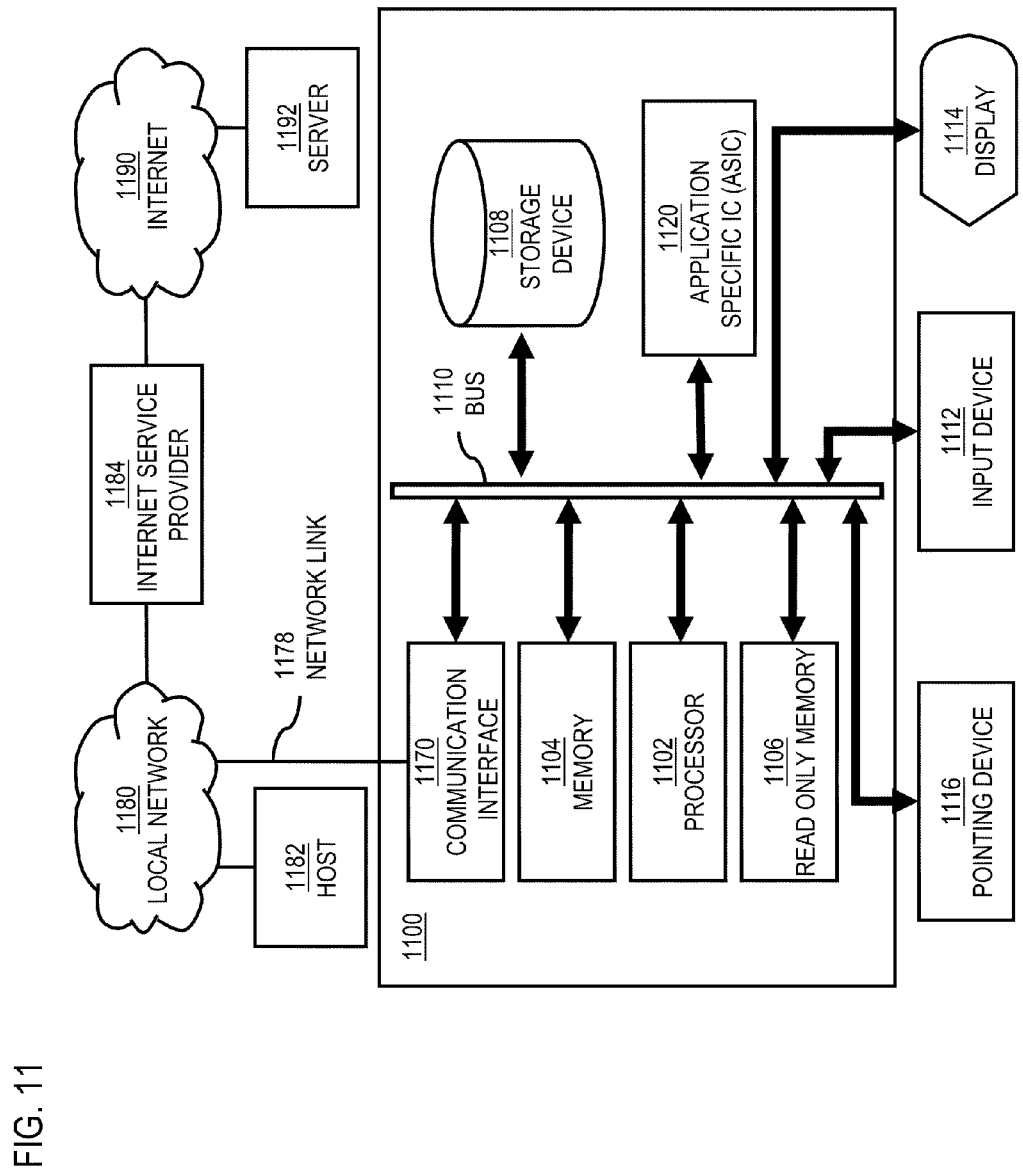
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to determine similar points-of-interest based on retrieved feature vectors as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of determining similar points-of-interest based on retrieved feature vectors.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to determining similar points-of-interest based on retrieved feature vectors. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for determining similar points-of-interest based on retrieved feature vectors. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for determining similar points-of-interest based on retrieved feature vectors, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for the UE 101.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set 1200 upon which an embodiment of the invention may be implemented. Chip set 1200 is programmed to determine similar points-of-interest based on retrieved feature vectors as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of determining similar points-of-interest based on retrieved feature vectors.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to determine similar points-of-interest based on retrieved feature vectors. The memory 1205 also stores the data associated with or generated by the execution of the inventive steps.

Figure 13:
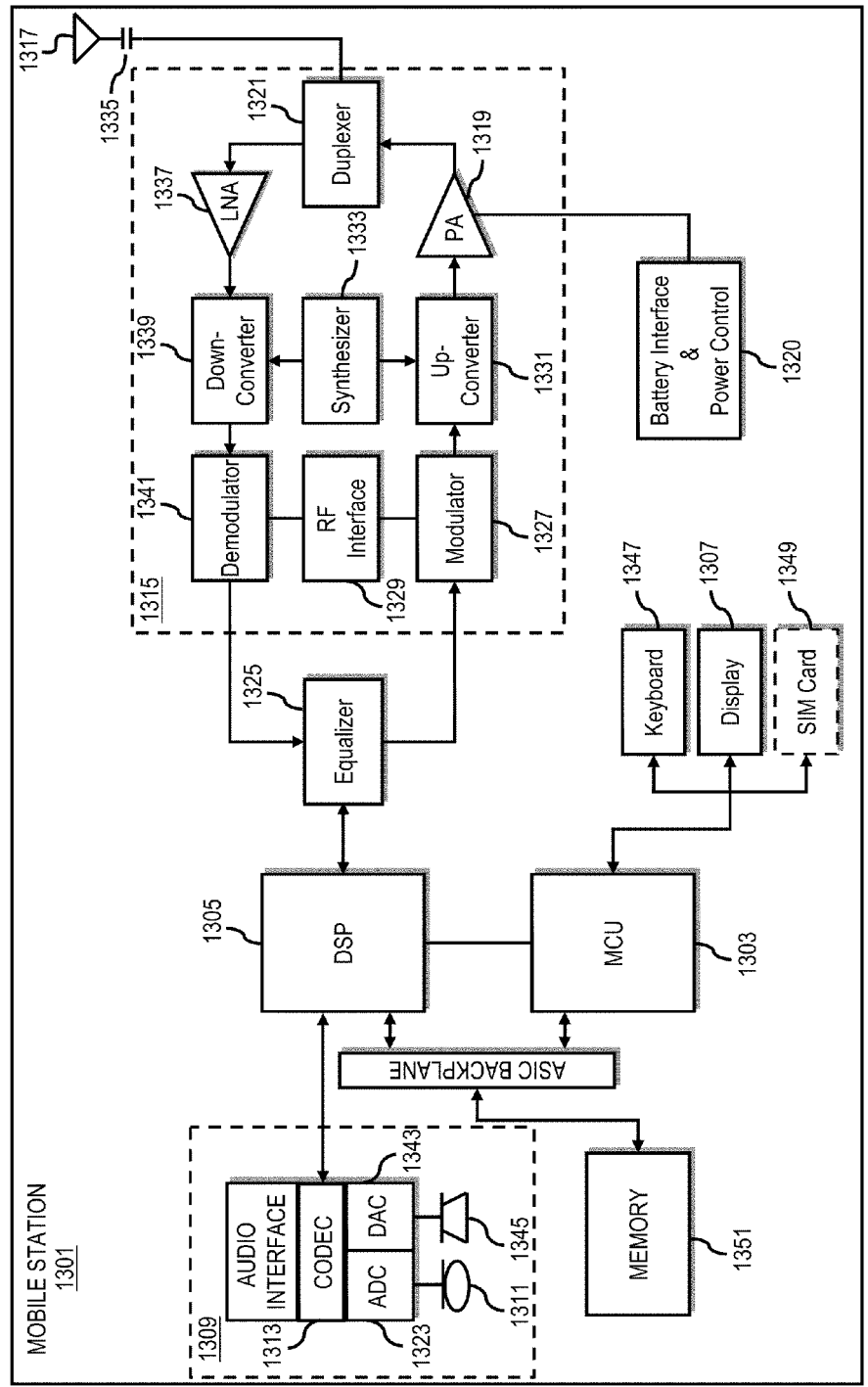
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1300, or a portion thereof, constitutes a means for performing one or more steps of determining similar points-of-interest based on retrieved feature vectors. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of determining similar points-of-interest based on retrieved feature vectors. The display 13 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to determine similar points-of-interest based on retrieved feature vectors. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The following patent application is incorporated herein by reference in its entirety: co-pending U.S. patent application Ser. No. 12/614,037 (NC70447US, P3382US00) filed Nov. 6, 2009, entitled "METHOD AND APPARATUS FOR PREPARATION OF INDEXING STRUCTURES FOR DETERMINING SIMILAR POINTS-OF-INTERESTS."

What is claimed is:
1. A method comprising:
receiving, by an apparatus, data specifying a reference point-of-interest specified by a user and location data of a search region;
retrieving, by the apparatus, a reference vector specifying a plurality of features associated with the reference point-of-interest;
determining, by the apparatus, a plurality of candidates for similar points-of-interest based, at least in part, on the search region;
retrieving, by the apparatus, candidate feature vectors specifying a plurality of features associated with respective candidates by at least real-time extracting semantic topics from one or more text descriptions and one or more user reviews for each of the candidates using a language model assigned a probability to each word thereof, and generating entries of the semantic topics in the feature vectors for each of the candidates, wherein the user reviews include one or more reviews by the user;
determining, by the apparatus, a similarity score for each of the candidates via comparing the plurality of features of respective candidates to the plurality of features of the reference point-of-interest to determine a number of common features (n) shared between the plurality of features of the respective candidates and the plurality of features of the reference point-of-interest, and calculating the similarity score using an equation including a weighting vector (w), the reference feature vector (r), a respective candidate feature vector (p):

$$\text{similarity}(r, p) = \sum_{i=1 \to n} w_i r_i p_i$$

where i=1 to the number of common features shared between the reference vector and the candidate feature vectors; and generating, by the apparatus, a list of one or more similar points-of-interest based on the similarity scores.

2. The method of claim 1, wherein one or more user preferences of a target user are common in the reference feature vector and the at least one other feature vector, and the method further comprising:
retrieving a machine learning algorithm; and
adjusting the weighting vector based on the one or more user preferences using the machine learning algorithm.

3. The method of claim 1, further comprising:
selecting one of the candidates for presentation based on the similarity scores, wherein the one candidate is associated with candidate data describing the candidate; and
causing, at least in part, actions leading to the presentation of the candidate data.

4. The method of claim 1, wherein the features comprise classification features, tag features, price features, ratings features, the semantic topics, or a combination thereof.

5. The method of claim 1, wherein the data is received from a user equipment and the search region is determined based on a location of the user equipment.

6. The method of claim 1, wherein the plurality of features is based on a taxonomy mapping tree structure that classifies the reference point-of-interest and the plurality of candidates into one or more categories, and wherein each node of taxonomy mapping tree structure increases in classification specificity.

7. An apparatus comprising:
at least one processor; and
at least one memory including computer program code,
the at least one memory and the computer program code configured to, with the at least one processor, cause the apparatus to perform at least the following,
receive data specifying a reference point-of-interest specified by a user and location data of a search region;
retrieve a reference vector specifying a plurality of features associated with the reference point-of-interest;
determine a plurality of candidates for similar points-of-interest based, at least in part, on the search region;
retrieve candidate feature vectors specifying a plurality of features associated with respective candidates by at least real-time extracting semantic topics from one or more text descriptions and one or more user reviews for each of the candidates using a language model assigned a probability to each word thereof, and generating entries of the semantic topics in the feature vectors for each of the candidates, wherein the user reviews include one or more reviews by the user;
determine a similarity score for each of the candidates via comparing the plurality of features of respective candidates to the plurality of features of the reference point-of-interest to determine a number of common features (n) shared between the plurality of features of the respective candidates and the plurality of features of the reference point-of-interest, and calculating the similarity score using an equation including a weighting vector (w), the reference feature vector (r), a respective candidate feature vector (p):

$$\text{similarity}(r, p) = \sum_{i=1 \to n} w_i r_i p_i$$

where i=1 to the number of common features shared between the reference vector and the candidate feature vectors; and
generate a list of one or more similar points-of-interest based on the similarity scores.

8. The apparatus of claim 7, wherein one or more user preferences of a target user are common in the reference feature vector and the at least one other feature vector, and the apparatus is further caused, at least in part, to:
retrieve a machine learning algorithm; and
adjust the weighting vector based on the one or more user preferences using the machine learning algorithm.

9. The apparatus of claim 7, wherein the apparatus is further caused, at least in part, to:
select one of the candidates for presentation based on the similarity scores, wherein the one candidate is associated with candidate data describing the candidate; and
cause, at least in part, actions leading to the presentation of the candidate data.

10. The apparatus of claim 7, wherein the features comprise classification features, tag features, price features, ratings features, the semantic topics, or a combination thereof.

11. The apparatus of claim 7, wherein the data is received from a user equipment and the search region is determined based on a location of the user equipment.

12. The apparatus of claim 7, wherein the plurality of features is based on a taxonomy mapping tree structure that classifies the reference point-of-interest and the plurality of candidates into one or more categories, and wherein each node of taxonomy mapping tree structure increases in classification specificity.

13. A non-transitory computer-readable storage medium carrying one or more sequences of one or more instructions which, when executed by one or more processors, cause an apparatus to at least perform the following steps:
receiving data specifying a reference point-of-interest specified by a user and location data of a search region;
retrieving a reference vector specifying a plurality of features associated with the reference point-of-interest;
determining a plurality of candidates for similar points-of-interest based, at least in part, on the search region;
retrieving candidate feature vectors specifying a plurality of features associated with respective candidates by at least real-time extracting semantic topics from one or more text descriptions and one or more user reviews for each of the candidates using a language model assigned a probability to each word thereof, and generating entries of the semantic topics in the feature vectors for each of the candidates, wherein the user reviews include one or more reviews by the user;
determining a similarity score for each of the candidates via comparing the plurality of features of respective candidates to the plurality of features of the reference point-of-interest to determine a number of common features (n) shared between the plurality of features of the respective candidates and the plurality of features of the reference point-of-interest, and calculating the similarity score using an equation including a weighting vector (w), the reference feature vector (r), a respective candidate feature vector (p):

$$\text{similarity}(r, p) = \sum_{i=1 \to n} w_i r_i p_i$$

where i=1 to the number of common features shared between the reference vector and the candidate feature vectors; and
generating a list of one or more similar points-of-interest based on the similarity scores.

14. The computer-readable storage medium of claim 13, wherein one or more user preferences of a target user are common in the reference feature vector and the at least one other feature vector, and the apparatus is caused, at least in part, to further perform:
retrieving a machine learning algorithm; and
adjusting the weighting vector based on the one or more user preferences using the machine learning algorithm.

15. The computer-readable storage medium of claim 13, wherein the apparatus is caused, at least in part, to further perform:
selecting one of the candidates for presentation based on the similarity scores, wherein the one candidate is associated with candidate data describing the candidate; and
causing, at least in part, actions leading to the presentation of the candidate data.

16. The computer-readable storage medium of claim 13, wherein the features comprise classification features, tag features, price features, ratings features, the semantic topics, or a combination thereof.

17. The computer-readable storage medium of claim 13, wherein the plurality of features is based on a taxonomy mapping tree structure that classifies the reference point-of-interest and the plurality of candidates into one or more categories, and wherein each node of taxonomy mapping tree structure increases in classification specificity.

* * * * *